Figure 2:
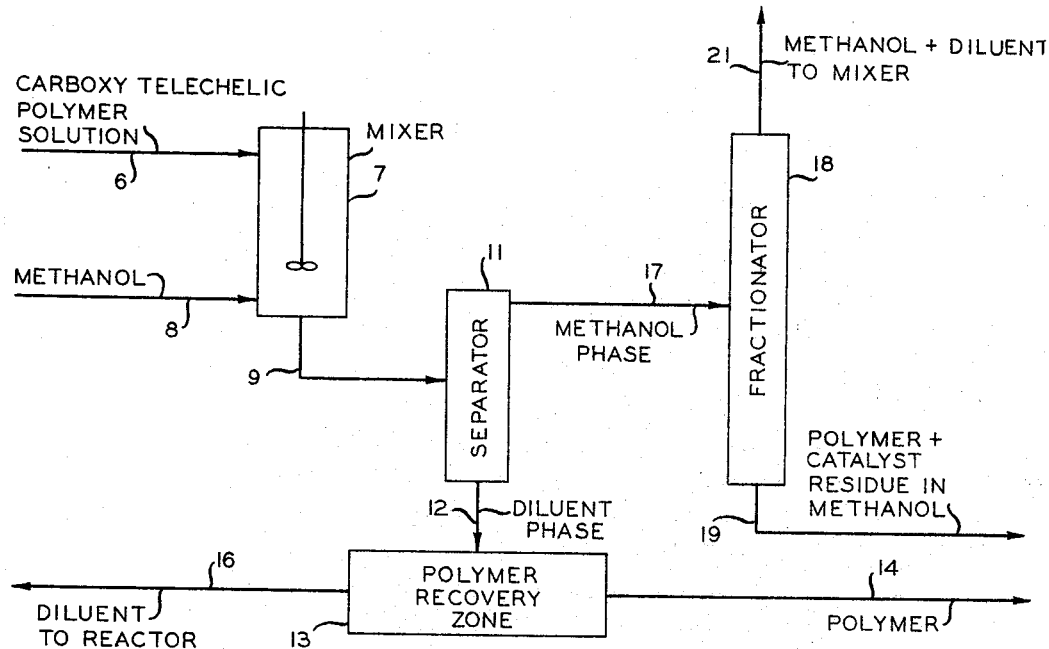

Nov. 22, 1966  C. W. STROBEL  3,287,344
REMOVAL OF CATALYST RESIDUES FROM CARBOXY-TELECHELIC POLYMERS
Filed Nov. 19, 1962

10   20   30   40   50   60   70   80   90   100
VOLUMES METHANOL /100 VOLUMES OF POLYMER SOLUTION

▨ DILUENT PHASE
◊ METHANOL PHASE
▩ INCOMPLETE PHASE FORMATION

INVENTOR.
C. W. STROBEL
BY Young & Quigg
ATTORNEYS

United States Patent Office 3,287,344
Patented Nov. 22, 1966

3,287,344
REMOVAL OF CATALYST RESIDUES FROM CARBOXY-TELECHELIC POLYMERS
Charles W. Strobel, Bartlesville, Okla., assignor to Phillips Petroleum Company, a corporation of Delaware
Filed Nov. 19, 1962, Ser. No. 238,518
2 Claims. (Cl. 260—94.7)

This invention relates to the purification of carboxy-telechelic polymers, and other carboxy-terminated polymers. In another aspect it relates to the removal of lithium-containing residues from telechelic polymers.

Telechelic polymers are conveniently prepared by polymerization of conjugated dienes and other monomers in the presence of organolithium initiators. Immediately following polymerization the reaction mixture is treated with an appropriate reagent, such as carbon dioxide, ethylene oxide, or the like, which reacts at the carbon-lithium bond, thereby resulting in a terminal functional group containing lithium. Reagents such as water, acid, or the like, can be used for removal of the lithium, i.e., replacement of the lithium with hydrogen, with the resultant formation of carboxy, hydroxy, etc., telechelic polymers. When aqueous treating agents are employed, the lithium compound formed as a by-product is present in the aqueous phase which, upon separation from the organic phase, should give a polymer solution free from lithium-containing residues.

A number of telechelic polymers, such as those of the aforementioned types, tend to form emulsions when water is present in recovery operations, and phase separation is extremely difficult. One method which has been developed for recovery of telechelic polymers, particularly those containing carboxy groups, comprises treating the polymer solution with anhydrous hydrogen chloride, thus circumventing the emulsion problem. Concurrently, lithium chloride is formed as finely divided dispersion in the polymer solution. If the lithium chloride is not removed, it remains as ash in the finished polymer.

Thus, the telechelic polymer product with which this invention deals is obtained in a solution which also contains the catalyst residues, say, lithium chloride, suspended therein in the form of fine or colloidal particles. It is these catalyst residues, resulting from the organo alkali metal catalyst, that this invention removes, utilizing an alcohol and a combination of steps involving phase separation and polymer recovery.

It is an object of this invention to provide a method for the purification of carboxy-telechelic polymers. It is another object to effect the removal of lithium-containing residues from telechelic polymers. It is yet another object to provide a method for the purification and recovery of a carboxy-telechelic polymer from its solution in a selected hydrocarbon solvent, also containing finely-divided or colloidally-suspended particulate catalyst residues, by utilizing a selected alcohol to wash said polymer solutions free of such residues.

Figure 1:
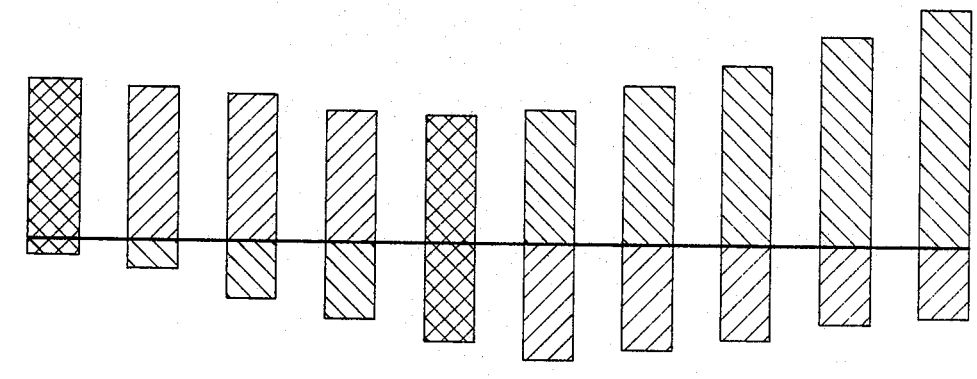

Other aspects, objects, and advantages of this invention will become apparent from a study of the disclosure, the appended claims, and drawing in which:

FIGURE 1 is a graph showing the effect on phase separation of various volume ratios of the extractant of this invention relative to the polymer solution being treated; and FIGURE 2 is a diagrammatic illustration of a continuous process for the practice of this invention.

According to the present invention, a convenient and very effective method for the removal of alkali metal-containing residue from carboxy-telechelic polymer solutions has now been provided. The method comprises treatment of the polymer solution with methanol. Through its use substantially complete removal of the alkali metal-containing residue from the polymer solution can be readily accomplished. By controlling the volume ratio of methanol to polymer solution good phase separation into a predominantly methanol phase containing all or almost all the metal residues, or ash, and a predominantly diluent phase containing almost all of the polymer can be accomplished. Ash free polymer is recovered from the diluent phase by any desired means, such as by fractionation, or coagulation of the polymer with isopropyl alcohol. Further, by maintaining the volumes of methanol per 100 volumes of polymer solution in such a ratio so that the density of the methanol phase is substantially greater or less than that of the diluent phase, relatively rapid separation of the two phases can be achieved.

In a preferred embodiment, a carboxy-telechelic polymer is obtained from polymerization of 1,3-butadiene, in the presence of organolithium initiators, followed by carbonation and neutralization with anhydrous HCl. To a cyclohexane solution of the carboxy-telechelic polybutadiene is added methanol, and after thorough mixing, the admixture thus obtained is allowed to separate into the two phases, a first phase containing methanol, some cyclohexane, and almost all of the lithium chloride residue, and a second phase containing cyclohexane, some methanol, and most of the polymer. Ash free polymer is recovered from the latter phase as previously described. Methanol uniquely performs this particular extraction, while higher alcohols do not.

The term "telechelic" has been coined to define the terminally reactive polymers. As used in this specification and in the claims, "telechelic polymers" means polymers of vinylidene-containing monomers which contain a reactive group on each end of the polymer molecule. Polymers in which a terminally reactive group is present on only one end of the polymer chain are designated as "semi-telechelic" polymers. Such polymers can be prepared by various methods including polymerization of vinylidene-containing monomers in the presence of an organo alkali metal catalyst. This invention is illustrated with those telechelic polymers which contain terminal carboxy groups, to be designated as "carboxy-telechelic" polymers.

Briefly, for purposes of the present disclosure and one skilled in the art reading the same, the following is noted:

The preferred monomers are the conjugated dienes containing from 4 to 12 carbon atoms and preferably 4 to 8 carbon atoms, such as 1,3-butadiene, isoprene, piperylene, methylpentadiene, phenylbutadiene, 3,4-dimethyl-1,3-hexadiene, 4,5-diethyl-1,3-octadiene, etc. In addition, conjugated dienes containing reactive substituents along the chain can also be employed, such as for example, halogenated dienes, such as chloroprene, fluoroprene, etc. Of the conjugated dienes, the preferred material is butadiene, with isoprene and piperylene also being especially suitable. Conjugated dienes can be polymerized alone or in admixture with each other.

In addition to the conjugated dienes I can practice my invention with other monomers containing a $CH_2=C<$ group such as the vinyl-substituted aromatic compounds. Examples of these compounds include styrene, 3-methylstyrene, 3,5-diethylstyrene, 1-vinylnaphthalene, 2-vinylnaphthalene, and the like. Certain polar monomers can also be employed such as vinylpyridines, vinylquinolines, acrylic and alkacrylic acid esters, and nitriles. Specific examples of these compounds include 2-vinylpyridine, 4-vinylpyridine, 3,5-diethyl-4-vinylpyridine, 5-methyl-2-vinylpyridine, 2-vinylquinoline, 3-methyl-4-vinylquinoline, methyl acrylate, ethyl acrylate, methyl methacrylate, acrylonitrile, and methacrylonitrile. These monomers can be used to form homopolymers or copolymers, including block copolymers, with each other or with conjugated dienes.

The polymers to which my invention may be applied are prepared by contacting the monomer with an organo alkali metal compound. While compounds containing only one alkali metal atom per molecule, such as n-butyllithium, are suitable and will produce mono-terminally reactive polymer, that is, polymer containing a reactive group on only one end of the polymer chain, it is preferred that an organo polyalkali metal compound be employed, for example, containing 2 to 4 alkali metal atoms. This method of removing alkali metal-containing residues is particularly applicable to polymer which has been prepared using initiators containing 2 alkali metal atoms.

The organo polyalkali metal compounds can be prepared in several ways, for example, by replacing halogens in an organic halide with alkali metals, by direct addition of alkali metals to a double bond, or by reacting an organic halide with a suitable alkali metal compound.

The organo polyalkali metal compound initiates the polymerization reaction, the organo radical being incorporated in the polymer chain and the alkalimetal atoms being attached at each end of the polymer chain. The polymers in general will be linear polymers having two ends; however, polymers containing more than two ends can be prepared. The general reaction can be illustrated graphically as follows:

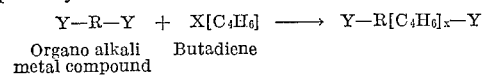

Organo alkali   Butadiene
metal compound or

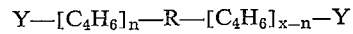

or combinations thereof.

A specific example is:

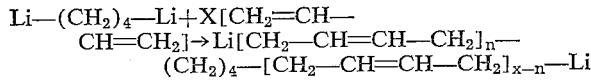

In the specific example, 1,4-addition of butadiene is shown; however, it should be understood that 1,2-addition can also occur.

While organo compounds of the various alkali metals can be employed in carrying out the polymerization, by far the best results are obtained with organolithium compounds which give very high conversions to the terminally reactive polymer. With organo compounds of the other alkali metals, the amount of mono-terminally reactive polymer, that is, polymer having alkali metal at only one end of the chain is substantially higher. The alkali metals, of course, include sodium, potassium, lithium, rubidium and cesium. The organic radical of the organo polyalkali metal compound can be an aliphatic, cycloaliphatic or aromatic radical.

The amount of initiator which can be used will vary depending on the polymer prepared, and particularly the molecular weight desired. Usually the terminally reactive polymers are liquids, having molecular weights in the range of 1000 to about 20,000. However, depending upon the monomers employed in the preparation of the polymers and the amount of initiator used, semi-solid and solid terminally reactive polymers can be prepared having molecular weights up to 150,000 and higher. Usually the initiator is used in amounts between about 0.25 and about 100 millimoles per 100 grams of monomer.

Formation of the terminally reactive polymers is generally carried out in the range of between —100 and +150° C., preferably between —75 and +75° C. The particular temperatures employed will depend on both the monomers and the initiators used in preparing the polymers. For example, it has been found that the organolithium initiators provide more favorable results at elevated temperatures whereas lower temperatures are required for effective initiation of polymerization to the desired products with the other alkali metal compounds. The amount of catalyst employed can vary but is preferably in the range of between about 1 and about 30 millimoles per 100 grams of monomers.

The polymerization is generally carried out in the presence of a suitable diluent, such as cyclopentane, methylcyclopentane, cyclohexane, methylcyclohexane, n-butane, n-pentane, isopentane, n-hexane, n-heptane, isooctane, n-decane, and the like. Generally, the diluent is selected from hydrocarbons, e.g., paraffins and cycloparaffins containing from 4 to 10 carbon atoms per molecule. As stated previously, the organolithium compounds are preferred as initiators in the polymerization reaction since a very large percentage of the polymer molecules formed contain two terminal reactive groups, and also the polymerization can be carried out at normal room temperatures.

The polymer thus formed is in solution in one of the abovementioned solvents. This solution can be reacted directly with the desired treating agent, e.g., carbon dioxide. It is sometimes desirable to dilute or concentrate the solution in order to obtain the best viscosity conditions for the carbonation step. The most desirable polymer concentration depends upon the molecular weight of the polymer and the type of polymer can readily be determined. Extremely dilute solutions can be treated but practical considerations concerning the handling of large quantities of solution make it desirable to use solution containing at least about 3 weight percent polymer. As explained above, the molecular weight of the polymer can range from 1000 to 150,000 or higher. The concentration of the polymer in solution ordinarily is not over 20 weight percent.

The temperature of the carbonation reaction should be maintained below 60° F. and preferably at about 40° F. or below. This temperature is best obtained by cooling the solution to about —60 to 60° F. and preferably below 40° F. before introducing it into the reactor.

The polymer is then treated with a suitable reagent, such as anhydrous HCl to convert the metal salt groups to carboxy groups. The reactions which take place are typified by the following equation, wherein P designates a polymer chain.

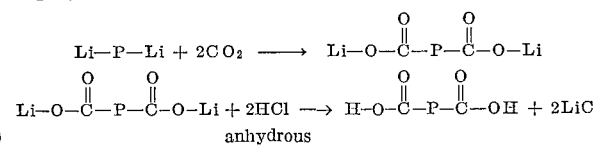

anhydrous

The amount of methanol employed will depend upon the concentration of the polymer solution and the diluent used in the polymerization. The invention resides in the removal of lithium-containing material from a telechelic polymer solution by washing the polymer solution with an amount of methanol sufficient to dissolve the lithium-containing material, but insufficient to coagulate the polymer, and to provide methanol and polymer solution phases of sufficient difference in density that phase separation readily occurs. When the polymerization diluent is cyclohexane and when it is used in amount to give a polymer concentration of around 5 to 10 weight percent, the amount of methanol required for optimum results is in the range of 60 to 100 volumes of polymer solution based on the cyclohexane. Generally, the alcohol wash is conducted at a temperature below the B.P. of the alcohol, preferably in the range of 50–125° F. for methanol.

The method of this invention is particularly applicable to telechelic polymers of relatively low molecular weight, i.e., 30,000 and below, frequently around 5,000, and is of special interest for the treatment of carboxy-telechelic polymers. Methanol is an agent for the removal of lithium compounds, which, if left in the polymer, would appear as ash in the finished product. The process is carried out under essentially anhydrous conditions and products of unusually low ash content are obtained. Lithium compounds are removed from polymers down to around 0.05 weight percent or less, and in many instances analyis has shown the absence of lithium-containing residues.

Referring now to the drawing, and to FIGURE 1 in particular, the effect on phase separation and phase inversion of varying volumes of methanol relative to the polymer solution comprising 100 parts by weight carboxylated polybutadiene in 1200 parts by weight of cyclohexane solvent is demonstrated. Phase separation is unsatisfactory below 10 volumes of methanol per 100 volumes of polymer solution and similarly around 50 volumes of methanol per 100 volumes of solution. Also, above 50 volumes of methanol per 100 volumes of solution, the phases invert, and the methanol phase comprises the upper phase.

The following examples serve to further characterize the type of solution with which this invention is concerned and from which the interrelated steps of the invention remove the organo alkali metal residue, for example, lithium chloride, wherein the alkali metal in the initiator has been lithium.

The following recipe was employed for the polymerization of butadiene:

| | |
|---|---|
| 1,3-butadiene, parts by weight | 100 |
| Cyclohexane, parts by weight | 840 |
| Lithium-isoprene adduct, mhm.[1] | 20 |
| Temperature, °F | 122 |
| Time, hours | 3 |
| Conversion, percent | Quantitative |

[1] Prepared in diethyl ether by reacting 0.4 mole of isoprene with 1.6 gm. atoms of lithium (containing 2 wt. percent of sodium). Mhm.=millimoles per 100 parts monomer.

Cyclohexane was charged, the reactor was purged with nitrogen, butadiene was added, and then the lithium-isoprene adduct. After a three-hour polymerization period the reaction mixture was carbonated and the lithium salt of the carboxy-telechelic polymer thus produced was neutralized with anhydrous hydrogen chloride using methyl violet as the indicator. This treatment converted the lithium salt groups in the polymer to carboxy groups, and lithium chloride formed as a finely divided suspension. The reaction mixture was diluted with cyclohexane to a level of 1200 parts by weight of diluent per 100 parts polymer. Polymer concentration in the solution was 7.7 weight percent Aliquots of the polymer solution were washed once at room temperature (75–80° F.) with variable amounts of methanol by being shaken vigorously for 5 to 10 seconds and allowed to stand. Phase separation was observed at different time intervals. Results are summarized in the following table:

It can be seen from the data that practical phase separation can be obtained at methanol levels of 20 to 40 volumes per 100 volumes of polymer solution. Poor phase separation, at best, occurs about 50 volumes methanol apparently because the two phases had nearly the same density. These data also show that most rapid phase separation occurred in runs in which the polymer solution was washed with 60 volumes and higher of methanol.

The methanol and diluent phases from runs 7 and 10 were analyzed. The following results were obtained:

*Methanol phase*

| | Run 7 | Run 10 |
|---|---|---|
| Methanol used in washing, volumes per 100 volumes polymer solution | 70 | 100 |
| Ratio of CH$_3$OH/cyclohexane in phase | 66.1/33.9 | 65.2/34.8 |
| Polymer found, wt. percent of total charged | 0.83 | 1.40 |
| Ash found, wt. percent of total charged | 100 | 99.14 |

*Diluent phase*

| | | |
|---|---|---|
| Ratio of CH$_3$OH/cyclohexane in phase | 5.4/94.6 | 5.3/94.7 |
| Polymer found, wt. percent of total charged | 99.17 | 98.60 |
| Ash found, wt. percent of total charged | 0.00 | [1] 0.86 |

[1] Ash content, based on recovered polymer analysis was 0.01 percent.

These data show that substantially complete removal of ash from the carboxy-telechelic polymer can be accomplished by washing the solution once with methanol.

FIGURE 2 of the drawing will now be described. A carboxy-telechelic polymer solution, comprising, for example carboxy telechelic polybutadiene in cyclohexane reaction diluent, passes via conduit 6 to agitated mixer 7. Conduit 8 separately introduces a stream of methanol to mixer 7. The effluent from mixer 7 passes via conduit 9 to a phase separator 11, wherein separation of the mixture into an upper methanol phase and a lower diluent phase occurs. The residence time ranges up to several hours.

A lower diluent phase is withdrawn from separator 11 via conduit 12 and comprises the carboxy-telechelic polymer, diluent and some methanol. This phase passes to a polymer recovery zone 13, wherein purified polymer is separated and withdrawn via conduit 14 and diluent saturated with methanol is withdrawn via conduit 16, the latter being recycled to the reactor (not shown).

An upper methanol phase is withdrawn overhead from vessel 11 via conduit 17 and passed to a separation vessel 18, such as a fractionator. The bottom stream 19 therefrom comprises essentially all lithium chloride residue from the catalyst dispersed in some methanol, and the polymer which was dissolved in this phase. Overhead vapor from fractionator 18 comprises a methanol-cyclohexane stream, which may be cooled and returned to mixer 7 via conduit 21.

| Run No. | Methanol | | Phase Height in Millimeters | | | | | | | |
|---|---|---|---|---|---|---|---|---|---|---|
| | Vol.[1] | Phase Location | 0.33 Hour | | 3.5 Hours | | 5.25 Hours | | 29.5 Hours | |
| | | | Top | Bottom | Top | Bottom | Top | Bottom | Top | Bottom |
| 1 | 10 | Bottom | (2) | (2) | (2) | (2) | (3) | (3) | (3) | (3) |
| 2 | 20 | do | (2) | (2) | 56 | 17 | 59 | 12 | 60 | 11 |
| 3 | 30 | do | (2) | (2) | 56 | 27 | 56 | 28 | 58 | 23 |
| 4 | 40 | do | (2) | (2) | 54 | 31 | 54 | 31 | 52 | 31 |
| 5 | 50 | | (2) | (2) | (2) | (2) | (3) | (3) | (3) | (3) |
| 6 | 60 | Top | (2) | (2) | 51 | 36 | 52 | 45 | 53 | 45 |
| 7 | 70 | Top | 55 | 50 | 62 | 42 | 62 | 42 | 62 | 42 |
| 8 | 80 | Top | 64 | 48 | 72 | 38 | 72 | 38 | 72 | 38 |
| 9 | 90 | Top | 77 | 41 | 84 | 32 | 84 | 32 | 84 | 32 |
| 10 | 100 | Top | 88 | 38 | 94 | 30 | 94 | 30 | 94 | 30 |

[1] Volumes per 100 volumes of polymer solution.
[2] No separation.
[3] Poor separation.

The extractant of the invention should, of course, not react with, say, the carboxy group of the carboxylic polymer under the conditions of operation when esterification or other reaction is desired to be avoided.

Reasonable variation and modification are possible within the scope of the foregoing disclosure, the drawing, and the appended claims to the invention.

I claim:

1. A process for the purification and recovery of carboxy telechelic polybutadiene from a solution of said polymer in cyclohexane, wherein the polymer concentration in said cyclohexane ranges from 5 to 10 weight percent, said solution also containing organo alkali metal catalyst inorganic residue which comprises: admixing with said solution methanol in the range of 20 to 40 and 60 to 100 volumes of methanol per 100 volumes of polymer solution, so as to form two phases therewith and which will substantially remove said catalyst residue from the polymer solution to the resulting methanol phase; and recovering polybutadiene substantially freed of said residue from the resulting cyclohexane phase.

2. The method of claim 1 wherein said organo alkali metal catalyst inorganic residue is lithium chloride.

References Cited by the Examiner

UNITED STATES PATENTS

| | | | |
|---|---|---|---|
| 1,515,001 | 11/1924 | Von Girsewald et al. | 23—89 |
| 2,991,279 | 7/1961 | Miller et al. | 260—94.7 |
| 3,074,917 | 1/1963 | Reynolds | 260—94.7 |
| 3,108,994 | 10/1963 | Zelinski et al. | 260—94.7 |

OTHER REFERENCES

Hodgeman, C. D., ed.: Handbook of Chemistry and Physics, 34th ed., Chemical Rubber Publishing Co. (1952), pp. 518–519.

JOSEPH L. SCHOFER, *Primary Examiner.*

LEON J. BERCOVITZ, *Examiner.*

C. R. REAP, H. I. CANTOR, *Assistant Examiners.*